United States Patent [19]
Keblys

[11] 3,907,847
[45] Sept. 23, 1975

[54] COMPOUND AND METHOD

[75] Inventor: Kestutis A. Keblys, Southfield, Mich.

[73] Assignee: Ethyl Corporation, Richmond, Va.

[22] Filed: July 25, 1973

[21] Appl. No.: 382,377

Related U.S. Application Data

[63] Continuation-in-part of Ser. No. 32,347, April 27, 1970, abandoned.

[52] U.S. Cl. ..... 260/429 R; 252/431 P; 260/604 HF
[51] Int. Cl. .............................................. C07f 15/00
[58] Field of Search ................................. 260/429 R

[56] References Cited
UNITED STATES PATENTS

| | | | |
|---|---|---|---|
| 3,102,899 | 9/1963 | Cannell | 260/439 R |
| 3,481,710 | 12/1969 | Maxfield | 260/429 R |
| 3,560,539 | 2/1971 | Booth | 260/429 R |
| 3,631,111 | 12/1971 | Tucci | 260/429 R |
| 3,644,446 | 2/1972 | Booth et al. | 260/429 R |
| 3,652,614 | 3/1972 | Dewhirst | 260/429 R |

OTHER PUBLICATIONS

Pruett et al., J. Org. Chem., 34, (1969), p. 327–330.
Pruett et al., Chem. Abstracts, 70 No. 86957.
Chemical Abstracts 70 (1969), p. 2872S.
Am. Chem. Soc. Abstracts of Meeting, 154 (1967), p. N. (No. 39).

*Primary Examiner*—Arthur P. Demers
*Attorney, Agent, or Firm*—Donald L. Johnson; Robert A. Linn

[57] ABSTRACT

Novel rhodium complexes having formula $HRhCO[L(OR)_3]_3$ are produced by reacting $XRhCO[L(OR_3]_2$, $L(OR)_3$ and a metal borohydride under controlled conditions. In the formulae, L is As, Sb or P; R is alkyl and/or aryl; X is a halogen. The complexes are rate improving hydroformylation catalysts.

17 Claims, No Drawings

COMPOUND AND METHOD

CROSS-REFERENCE TO RELATED APPLICATION

This application is a Continuation-in-Part of copending application Ser. No. 32,347, filed Apr. 27, 1970 now abandoned.

BACKGROUND OF THE INVENTION

This invention is directed to novel rhodium complexes, exemplified by $HRh(CO)[P(OO)_3]_3$, a method for their preparation and their use as hydroformylation (oxo) catalysts.

Rhodium complexes having the formula $HRh(CO)(PR_3)_3$, wherein R is an aryl group, are known hydroformylation catalysts. Methods for preparing these complexes are described in articles by S. S. Bath and A. Vaska, J. Amer. Chem. Soc., 85, 3500 (1963); and D. Evans, G. Yagupsky and G. Wilkinson, J. Chem. Soc., A. 2660–2664 (1968); and their use as hydroformylation catalysts is disclosed in articles by P. S. Hallman, D. Evans, J. A. Osborn and G. Wilkinson, Chem. Commun. 305–306 (1967); D. Evans, J. Osborn, and G. Wilkinson, J. Chem. Soc., A, 3133–3142 (1968); C. K. Brown and G. Wilkinson, Tetrahedron Lett., 1725–1726 (1969); and R. L. Pruett and J. A. Smith, J. Org. Chem., 34 327–330 (1968).

In the Pruett and Smith article, a speculative mechanism for reactions occurring in a hydroformylation reaction wherein rhodium on carbon black in the presence of excess hydrocarbyl phosphite or phosphine is used as the catalyst, is described. The reaction equations illustrating said mechanism on Page 329 of said article shows the formula $HRh(CO)(PR_3)$, wherein $PR_3$ apparently may be a phosphite or phosphine ligand. Although this generic formula includes phosphite ligands, no method for preparing such complexes is disclosed or suggested. The reaction equations simply illustrate what the authors speculate may be occurring in situ, during hydroformylation using the rhodium on carbon/hydrocarbyl phosphine or phosphite catalyst system. The hydridorhodium carbonyl tris-phosphites are not isolated as such or identified in any other way.

It has presently been discovered that complexes of the type represented by formula $HRh(CO)[P(OR_3)_3]$ do exist; they are prepared using a novel process; and they are active hydroformylation catalysts.

SUMMARY OF THE INVENTION

Complexes having the formula $HRh(CO)[L(OR)_3]_3$ wherein L is P, As, or Sb, and R is alkyl and/or aryl; a method for preparing said complexes from $XRh(CO)[L(OR)_3]_3$ (wherein X is a halogen), a stoichiometric amount, based on $XRh(CO)[L(OR)_3]_3$, of $L(OR)_3$ and a metal borohydride in an alkanol solvent at temperatures of about −20°C. to about 30°C.; a hydroformylation process utilizing said complexes as catalysts.

DESCRIPTION OF THE PREFERRED EMBODIMENT

One embodiment of the present invention is compounds having the formula $$HRh(CO)[L(OR_1)(OR_2)(OR_3)]_3$$

wherein L is selected from P, As, and Sb, and $R_1$, $R_2$, $R_3$ are independently selected from the groups consisting of alkyl, alkaryl, aryl and aralkyl, said groups having from 1 to about 18 carbon atoms. Compounds of formula I wherein L is phosphorus are preferred; while more preferred compounds are those of Formula I wherein L is phosphorus and $R_1$, $R_2$, $R_3$ are aryl and alkaryl groups; and aryl and alkaryl groups may be substituted or unsubstituted and preferably include phenyl as the aryl moiety. More preferred compounds of Formula I are those in which L is phosphorus and $R_1$, $R_2$, $R_3$ are the same.

The novel compounds of the present invention are hydridorhodium carbonyl complexes having Formula I wherein L is P, As, or Sb, and $R_1$, $R_2$, $R_3$ are alkyl and/or aryl groups. The alkyl groups include substituted and unsubstituted alkyl groups as well as linear and branched alkyl groups. Acyclic and alicyclic alkyl groups are also included. Illustrative of substituents on substituted alkyl groups are phenyl, halogen, $C_1$–$C_4$ alkoxy, cyano and nitro groups. Aryl groups likewise include substituted as well as unsubstituted groups. Illustrative of substituents on substituted phenyl groups are halogen, $C_1$–$C_4$ alkoxy, cyano, nitro and $C_1$–$C_6$ alkyl groups. The total number of carbon atoms in said alkyl and/or aryl groups is not critical; and alkyl and aryl groups having up to about 20 carbon atoms are preferred.

The novel compounds are exemplified by complexes having Formula I wherein the ligand group $L(OR_1)(OR_2)(OR_3)$ is as follows:

Methyldiphenyl phosphite
Butylisopropylphenyl phosphite
Triethyl phosphite
Trieicosyl phosphite
Tri-2-ethyl-n-hexyl phosphite
Tri-indenyl phosphite
Tri-β-naphthyl phosphite
Dicyclooctyl-n-decyl phosphite
n-Propyldi-p-tolyl phosphite
Tri-m-nitrophenyl phosphite
Tri-m-fluorophenyl phosphite
Tri-m-trifluoromethylphenyl phosphite
Tridodecyl phosphite
Tricyclohexyl phosphite
Dibutyl-β-naphthyl phosphite
Trimethyl arsenite
Tri-p-chlorophenyl arsenite
Dipentylphenyl arsenite
Tri-o-tolyl arsenite
Octadecyl-di-indenyl arsenite
Tri-2-methylbutyl arsenite
Tri-(2-chloroethyl)arsenite
Tri-(4-phenyl-n-butyl)arsenite
Trixylyl arsenite
$Sb(-O-C_3H_7)_3$

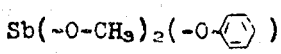

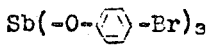

$Sb(-O-C_8H_{17})_3$
$Sb(-O-C_{20}H_{41})_3$

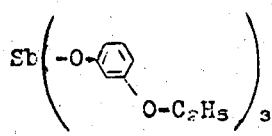

Sb(—O—C₉H₁₉)₃

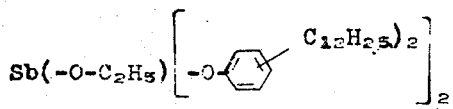

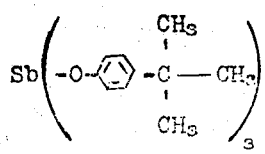

P(—O—C₂₀H₄₀Cl)₃

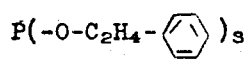

P(—O—C₂H₄—O—CH₃)₃
P(—O—C₃H₆CN)₃
Tri-p-butoxyphenylarsenite
Tri-p-cyanophenylarsenite
Tri-m-nitrophenylarsenite
Tri-α-naphthylarsenite
As(—O—C₄H₈—O—C₄H₉)₃
As(—O—C₁₂H₂₄CN)₃
Tri-(m-hydroxyphenyl)arsenite
Tri-(p-hydroxyphenyl)antimonite
Tribiphenylyl antimonite
Tri-p-cyanophenyl antimonite
Tri-p-nitrophenyl antimonite
Triindenyl antimonite
Tri-α-naphthyl antimonite
Sb(—O—C₁₀H₂₀I)₃
Sb(—O—C₆H₁₂—F)₃
Sb(—O—C₂H₄—O—C₂H₅)₃
Sb(—O—C₈H₁₆CN)₃
Tribenzyl antimonite
Tri-p-hexylphenyl phosphite
Tri-p-butoxyphenyl phosphite
Tri-α-naphthyl phosphite
Tri-p-hydroxyphenyl phosphite
P(O—C₂H₅Br)₃

Preferred complexes are those wherein L(OR₁)(OR₂)(OR₃) is a phosphite. Most preferred complexes are those wherein L(OR₁)(OR₂)(OR₃) is a phosphite and R₁, R₂, R₃ are the same. Examples of such preferred complexes are:

Hydridorhodiumcarbonyltris(tri-p-cyanophenylphosphite)
Hydridorhodiumcarbonyltris(tricyclohexylphosphite)
Hydridorhodiumcarbonyltris(triethylphosphite)
Hydridorhodiumcarbonyltris(tribenzylphosphite)
Hydridorhodiumcarbonyltris(tri-p-bromophenylphosphite)
Hydridorhodiumcarbonyltris(tri-p-methoxyphenylphosphite)
Hydridorhodiumcarbonyltris(triheptylphosphite)
Hydridorhodiumcarbonyltris(triphenylphosphite)
Hydridorhodiumcarbonyltris(tri-m-nitrophenylphosphite)
Hydridorhodiumcarbonyltris(tribiphenylylphosphite)
Hydridorhodiumcarbonyltris(tri-p-trichloromethylphenylphosphite)

Another embodiment of this invention is a novel process for preparing the compounds having Formula I. The process comprises reacting a compound having the formula $$XRh(CO)[L(OR_1)(OR_2)(OR_3)]_2$$

II with a substantially stoichiometric amount, based on the compound having Formula II, of a compound having the formula $$L(OR_1)(OR_2)(OR_3)$$

III and a metal borohydride in a C₁—C₁₀ alkanol reaction medium at temperatures ranging from about —20°C. to about 30°C. L and R in Formulae II and III are as defined above; X in Formula II is a halogen selected from chlorine, bromine and iodine. It is important in the novel process that (1) greater than stoichiometric amounts of the compound having Formula III be avoided and (2) that the reaction temperatures be below about 30°C.

The method for preparing the aforesaid compounds can be illustrated by the following reaction equation:

XRhCO[L(OR)₃]₂ + L'(OR')₃ + metal borohydride $\xrightarrow{C_2—C_{10}\ alkanol}{15°C.}$ HRh(CO)[L(OR)₃]₂[L'(OR')₃]
1 mole        1 mole It is apparent from the above equation that the overall reaction results in the addition of one L'(OR')₃ ligand to the replacement of the halogen X with hydrogen in the Formula II reactant. There is no change in oxidation state of the rhodium during the course of the reaction since rhodium is +1 in both the Formula II reactant and in the resulting novel complex (Formula I).

It is clear then that the complexes of the present invention, as described above, can be prepared by chosing appropriate reactants having Formula II and Formula III.

It is important, however, in carrying out the present method that a molar ratio of Formula II reactant:Formula III reactant be substantially 1:1. By substantially, I mean that the molar ratio of Formula II reactant:Formula III reactant can range from about 1:0.8 to about 1:1.1; with a ratio of 1:1 being most preferred. In other words an excess of Formula III reactant must be avoided.

The reaction of the present method is carried out in an alkanol medium. The reactants having Formulae II and III and the borohydride may be soluble in the alkanol medium. However, solubility of the reactants in the alkanol is not necessary. Useful alkanols have from 2 to about 10 carbon atoms and are preferrably monohydroxy alkanols. Amyl alcohol, 1-decanol, 2-ethyl-n-hexanol, tert-butanol, 3-methyl-n-butanol are some examples of useful alkanols. Alkanols having up to 6 carbon atoms are preferred. The lower molecular weight $C_2$—$C_3$ alkanols are more preferred, for example, ethanol, isopropanol, and n-propanol.

The amount of alkanol reaction medium may be varied over a wide range. Optimum amounts of alkanol for a particular reaction may depend on other factors such as solubility of the reactants for example. Where the reactants are readily soluble in the alkanol, then it may be convenient to use sufficient alkanol to dissolve the reactants. However, it is not necessary that the reactants be readily soluble in the alkanol; the reaction will proceed as readily when the reactants are simply dispersed in a suitable amount of alkanol.

The metal borohydride reactant includes compounds of the type $M^{+n}(BH_4)_n$ where M is a metal such as Li, Na, K, Be, Mg, Al, Ti, Zr, and the like and n is the valence of said metal M; and compounds such as $M^{+n}[HB(OCH_3)_3]_n$ and the like. Preferred borohydrides are the alkali metal containing compounds such as $NaBH_4$, $Na[HB(OCH_3)_3]$, $KBH_4$, $LiBH_4$, $K[HB(OC_2H_5)_3]$, $Li[HB(OCH_3)_3]$ and the like. $NaBH_4$ is most preferred.

At least a stoichiometric amount of metal borohydride is used in the present process, that is at least one mole of borohydride per mole of Formula II compound. Generally an excess up to twice this stoichiometric amount of borohydride is used. It is preferred that when an excess is used it should not be over 1.25 times the stoichiometric amount. In other words, it is preferred to use up to about 1.25 moles of the borohydride in the reaction per mole of Formula II compound.

The reaction temperature must be maintained below about 30°C. Generally, a reaction temperature ranging from about —20°C. to about 30°C. can be used. A preferred reaction temperature range is about 0°C. to about 15°C.

Compounds having Formula II are known and can be prepared by any suitable method. One method for preparing Formula II-type compounds is disclosed in an article by L. Vallarino, Jour. Chem. Soc. p. 2474 (1957).

The following examples illustrate the process of the present invention. All parts are by weight unless otherwise indicated. The abbreviation mmoles used herein means millimoles.

EXAMPLE 1

Preparation of Hydrido Rhodium Carbonyl Tris Triphenylphosphite

A suspension of 1.980 grams (2.52 mmoles) of

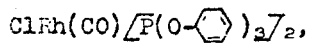

in 19 milliliters of ethanol was prepared; charged to a suitable vessel and cooled to 0° with stirring; then 0.787 grams (2.54 mmoles) of triphenyl phosphite in 6 milliliters of ethanol were added. Next, 0.10 grams (2.63 mmoles) of sodium borohydride powder were added and the suspension was stirred at 0° for 80 minutes. Then another portion of sodium borohydride (0.05 grams) was added and the suspension was stirred at 0° for 45 additional minutes. At the end of this time, the reaction mixture was filtered and a light colored solid was obtained. This solid was washed in ethanol and dried in vacuum. The resulting off-white solid was dissolved in about 10 milliliters of benzene and the solution was filtered. The yellow filtrate obtained was condensed under vacuum to about 5 milliliters. Ethanol was added and a light colored precipitate formed.

The mixture was filtered (after additional evaporation). The solution thus obtained was washed with ethanol and dried in vacuum giving 2.30 grams (86 percent yield) of light yellow powder, melting point 119°–120°C. Infrared analysis of a benzene solution of said powder showed bands at 2075 (strong, sharp), 1990, and 1960 $cm^{-1}$ (medium, poorly resolved). In Nujol mull, the yellow powder showed bands at 2040 (sharp) and in 1945 – 1950 $cm^{-1}$ (broad, poorly resolved). Nuclear magnetic resonance analysis gave a weak signal at about 19.7τ. Elemental analysis of the yellow powder showed $C = 61.9\%$; $H = 4.68\%$; the calculated elemental analysis for hydridorhodiumcarbonyltris (triphenylphosphite). $RhC_{55}H_{46}O_{10}P_3$ is $C = 62.2\%$; $H = 4.35\%$. The light yellow powder obtained as a product was thereby identified as hydridorhodiumcarbonyltris(triphenylphosphite).

Similar results are obtained when the reaction is carried out at —20°C., —10°C., 5°C., or 30°C. When potassium borohydride, aluminum borohydride, lithium borohydride, $Na[HB(OCH_3)_3]$, or mixtures of similar borohydrides are used in place of the sodium borohydride in Example 1, analogous results are obtained. Methanol, n-decanol, 2-ethylhexanol, tertbutanol or isopropanol when used in place of ethanol in Example 1 effect equivalent results.

EXAMPLE 2

Preparation of Hydrido Rhodium Carbonyl Tris(Tri-p-chlorophenylphosphite)

To a suspension of 4.20 grams (4.23 mmoles) of chlororhodiumcarbonylbis(tri-p-chlorophenylphosphite), cooled to 0°C. were added 1.755 grams (4.25 mmoles) of tris(p-chlorophenyl)phosphite in 13 milliliters of ethanol. Then 0.1 grams (2.63 mmoles) of sodium borohydride was added. Immediate gas evolution occurred and the mixture turned yellow. Incremental amounts of sodium borohydride were added to the reaction mixture as follows: 0.06 grams after 2 hours, 0.05 grams after 4.5 hours, and 0.02 grams after 6 hours. Total reaction time was 6.5 hours and a total of 0.23 grams (about 6 mmoles of sodium borohydride) was added during this period.

At the end of this time the reaction mixture was filtered; and a light colored solid was obtained. The solid was washed with ethanol, dried and dissolved in about 10 milliliters of benzene. The benzene solution was filtered and evaporated to about 6 milliliters. About 15 milliliters of ethanol was added thereto. This solution was then evaporated and a white solid and yellow-orange semisolid gum precipitated. The mixture was triturated with ethanol until all of the gum solidified. The mixture was then filtered and a light colored solid was obtained. This solid was washed with ethanol and dried in vacuum. A 46% yield (2.70 grams) of pale yellow powder, melting point 89°–92°C. was obtained. A benzene solution of the yellow powder on infrared analysis showed bands at 2075 $cm^{-1}$ (sharp), poorly resolved band cluster at 1995, 1975 and 1960 $cm^{-1}$ and weak bands at 1885, 1760 and 1640 $cm^{-1}$. In Nujol mull, only 2 sharp bands at 2030 and 1935 $cm^{-1}$ were observed. Elemental analysis of the yellow powder showed $C = 49.2\%$; $H = 3.32\%$; $Cl = 23.5\%$. The calculated elemental analysis for hydridorhodiumcarbonyltris(tri-p-chlorophenylphosphite)(RhC$_{55}$H$_{37}$Cl$_9$O$_{10}$P$_3$) is $C = 48.1\%$; $H = 2.72\%$; $Cl = 23.2\%$. The yellow powder product obtained was thereby identified as hydridorhodiumcarbonyltris(tri-p-chlorophenylphosphite).

Following the procedure substantially as illustrated by Examples 1 and 2 above, the following reaction systems produce the products as indicated.

Example 3

| Reaction System | Product |
|---|---|
| BrRhCO[As(-O-⌬-CH$_3$)$_3$]$_3$ - 1 mole | HRhCO[As(-O-⌬-CH$_3$)$_3$]$_3$ |
| Tritolylarsenite - 1 mole | |
| Potassium borohydride | |
| In methanol at -15°C. | |

EXAMPLE 4

| Reaction System | Product |
|---|---|
| IRhCO[Sb-(O-⌬-OC$_2$H$_5$)$_3$]$_2$ - 1 mole | HRhCO[Sb-(O-⌬-OC$_2$H$_5$)$_3$]$_3$ |
| Sb(-O-⌬-OC$_2$H$_5$)$_3$ - 1.1 moles | |
| Lithium borohydride | |
| In isopropanol, at 25°C. | |

Example 5

| Reaction System | Product |
|---|---|
| ClRhCO[As-(O-⌬-⌬)$_3$]$_2$ - 1 mole | HRhCO[As-(O-⌬-⌬)$_3$]$_3$ |
| As-(O-⌬-⌬)$_3$ - 0.8 moles | |
| Na[HB(OCH$_3$)$_3$] | |
| In n-octanol, at 20°C. | |

Example 6

| Reaction System | Product |
|---|---|
| BrRhCO[P-(OC$_3$H$_7$)$_3$]$_2$ - 1 mole | HRhCO[P-(O-C$_3$H$_7$)$_3$]$_3$ |
| P-(O-C$_3$H$_7$)$_3$ - 1.05 moles | |
| NaHB(OC$_3$H$_7$)$_3$ | |
| In decanol, at 30°C. | |

Example 7

| Reaction System | Product |
|---|---|
| ClRhCO[P(-O-⌬-NO$_2$)$_3$]$_2$ - 1 mole | HRhCO[P(-O-⌬-NO$_2$)$_3$]$_3$ |
| P(-O-⌬-NO$_2$)$_3$ - 1.01 moles | |
| NaBH$_4$ | |
| In cyclohexanol, at 5°C | |

Example 8

Reaction System

$BrRhCO[Sb(-O-C_6H_5)_3]_2$ - 1 mole $Sb(-O-C_6H_5)_3$ - 0.9 moles $K[HB(-OC_4H_9)_3]$ In 2-ethylbutanol, at 18°C.

Product

$HRhCO[Sb(-OC_6H_5)_3]_3$

Example 9

Reaction System

$IRhCO[P(-O-CH_2-C_6H_5)_3]_2$ - 1 mole $P(-O-CH_2-C_6H_5)_3$ - 1 mole $LiBH_4$

In tert-butanol, at 2°C.

Product

$HRhCO[P(-O-CH_2-C_6H_5)_3]_3$

Example 10

Reaction System

$ClRhCO[P(-O-C_6H_4-CN)_3]_2$ - 1 mole $P(-O-C_6H_4-C\equiv N)_3$ - 0.95 moles $KBH_4$ In ethanol, at 25°C.

Product

$HRhCO[P(-O-C_6H_4-C\equiv N)_3]_3$

Example 11

Reaction System

$ClRhCO[P(-O-C_6H_4-CF_3)_3]_2$ - 1 mole $P(-O-C_6H_4-CF_3)_3$ - 1.1 moles $NaBH_4$ In ethanol, at 15°C.

Product

$HRhCO[P(-O-C_6H_4-CF_3)_3]_3$

Example 12

Reaction System

$BrRhCO[As(-O-CH_2-CH_2-Cl)_3]_2$ - 1 mole $As(-OCH_2-CH_2Cl)_3$ - 1 mole $LiBH_4$ In mixed amyl alcohols, at -2°C.

Product

$HRhCO[As(-O-CH_2-CH_2Cl)_3]_3$

Example 13

Reaction System

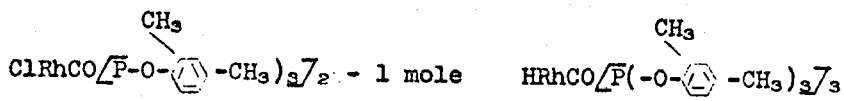 - 1 mole

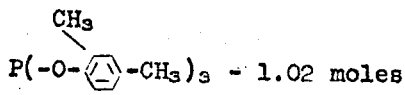 - 1.02 moles

KBH$_4$

In 2-ethyl-n-hexanol, at 30°C.

Product

HRhCO[P(-O-⌬-CH$_3$)$_3$]$_3$

Example 14

Reaction System

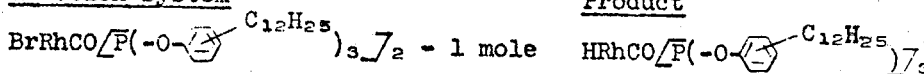 - 1 mole

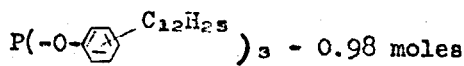 - 0.98 moles

NaBH$_4$

In methanol, at -22°C.

Product

HRhCO[P(-O-⌬-C$_{12}$H$_{25}$)$_3$]$_3$

EXAMPLE 15

Reaction System
ClRhCO[As(—O—C$_{12}$H$_{25}$)$_3$]$_2$ — 1 mole
As(—O—C$_{12}$H$_{25}$)$_3$ — 1.02 moles
K(BH$_4$)
In hexanol-3, at −8°C.

Product
HRhCO[As(—O—C$_{12}$H$_{25}$)$_3$]$_3$

Example 16

Reaction System

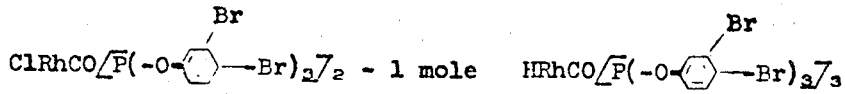 - 1 mole

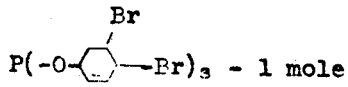 - 1 mole

LiBH$_4$

In propanol, at -3°C.

Product

HRhCO[P(-O-⌬-Br)$_3$]$_3$

Example 17

Reaction System

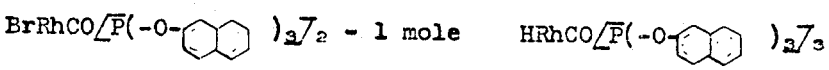 - 1 mole

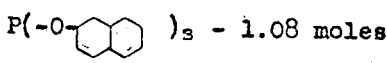 - 1.08 moles

NaBH$_4$

In ethanol, at 29°C.

Product

HRhCO[P(-O-naphthyl)$_3$]$_3$

EXAMPLE 18

Reaction System
IRhCO[P(—O—C$_2$H$_5$)$_3$]$_2$ — 1 mole
P(—O—C$_2$H$_5$)$_3$ — 1 mole
Al(BH$_4$)$_3$
In sec-butanol, at 0°C.

Product
HRhCO[P(—O—C$_2$H$_5$)$_3$]$_3$

Example 19

Reaction System

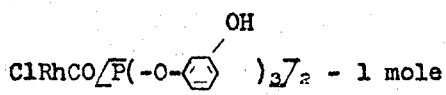 - 1 mole

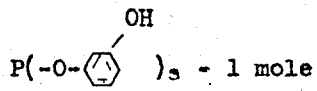 - 1 mole

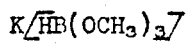

In heptanol, at -70°C.

Product

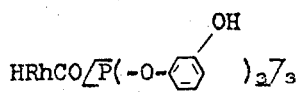

Example 20

Reaction System

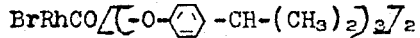 - 1 mole

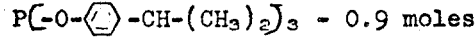 - 0.9 moles $LiBH_4/NaBH_4$

In 50/50 methanol/decanol, at 22°C.

Product

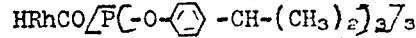

Another embodiment of this invention is a hydroformylation process which comprises reacting a $C_2$—$C_{32}$ olefinic compound having at least one alpha carbon-to-carbon double bond with carbon monoxide and hydrogen under 1 to 500 atmospheres pressure in the presence of a catalytic amount of the rhodium complex having Formula I wherein (a) X is arsenic antimony or phosphorous and (b) $R_1$, $R_2$, $R_3$ are independently selected from alkyl and aryl groups having up to about 18 carbon atoms. The product obtained from the hydroformylation reaction is aldehyde having at least one carbon atom more than the olefinic reactant.

A preferred hydroformylation process is the process described above wherein the rhodium complex used as a catalyst has the formula $$HRh(CO)[P(OR_1)(OR_2)(OR_3)]_3 \qquad IV$$

where $R_1$, $R_2$, $R_3$ are as defined above; a more preferred hydroformylation catalyst is the Formula IV complex wherein $R_1$, $R_2$, $R_3$ are the same. A most preferred catalyst is a complex having the formula HRh(CO)[P—(OR)$_3$]$_3$ wherein R is phenyl or substituted phenyl group as disclosed herein.

Olefinic organic compounds which contain at least one non-aromatic carbon-to-carbon double bond may be hydroformylated in the present process. Preferred olefinic organic compounds are the olefins. By olefins, I mean compounds having at least one alpha double bond. Useful olefins include acyclic and cyclic olefins, branched and linear olefins, monounsaturated and polyunsaturated olefins, substituted and unsubstituted olefins. Examples of olefins which are suitable for use in the present hydroformylation process are 4,5-dibromododecene, 1,4,7-decatriene, 1,4-octadiene, 1,5-nonadecadiene, 1-tridecen-12-ol, 1,5,8-dodecatriene, 1,6-pentacosadiene, 2-isobutylhexene-1, 4,6,8-trimethylnonene-1, 4-chlorotetradecene-1, 8-phenyloctene-1, and the like. Mixtures of olefins may also be used.

Particularly preferred olefins are $C_2$—$C_{32}$ olefins having one or more alpha double bonds. The particularly preferred olefins having more than one alpha double bond are further characterized in that the double bonds are isolated, that is, separated by at least one carbon atom. Thus, preferred olefins are exemplified by compounds such as 1,5-hexadiene, 1-decene, 1,4-pentadiene, 1-octadecene, 1-heptadecene, 1-tetradecene, 2-methylhexadecene, 1,22-tricosadiene, 1,13-tetradecadiene, cyclohexene, cyclooctene, 1,6-cyclododecadiene, 1-butene and the like.

The olefins which are especially preferred are alpha monoolefins having 2 through 32 carbon atoms. Examples of the especially preferred monoolefins are ethylene, 1-propene, 1-pentene, 3-methylundecene, 1-heptadecene, 1-nonadecene, 1-dotriacontene, 1-eicosene, 3,5-dimethyldecene, and the like. Mixtures of monoolefins can also be used.

The catalyst which is used in the hydroformylation process of this invention is a rhodium complex having Formula I. This complex offers an advantage in that it is sufficiently soluble in typical hydroformylation reaction solvents and/or in the olefinic reactants, and thus the reaction can be carried out in a homogeneous rather than a heterogeneous system.

The rhodium complexes which are suitable as catalysts are described and exemplified above in the disclosure relating to the complexes and their method of preparation.

The hydroformylation reaction of this invention can be carried out in a liquid reaction medium. This liquid reaction medium is such that it should not interfere with the desired hydroformylation reaction nor react with the products obtained therefrom. This liquid reaction medium furthermore is preferably a solvent for the catalyst and the unsaturated organic reactant. Examples of suitable media of this type are hydrocarbons such as benzene, toluene, Decalin, decane and the like, and oxygenated organic compounds such as dimethyl carbitol, diisobutyl ketone and the like. Other organic media which meet the criteria set forth above can also be used. Where the olefinic reactant is liquid under the reaction conditions, and the catalyst is sufficiently soluble therein, no other reaction medium is required.

The hydroformylation process of this invention can be carried out at temperatures from about 0°C. to about 120°C. A preferred temperature range for the present reaction is from about 0°C. to about 50°C.; a most preferred range is about 20°C. to about 50°C.

This reaction can be carried out under pressures ranging from about 1 to about 500 atmospheres. It is preferred that pressures from 1 to about 10 atmospheres be used. Since the reactants, carbon monoxide and hydrogen, are gases under the conditions of this reaction, these gases can be ordinarily used to maintain the desired reaction pressure. If necessary, however, the pressure may be maintained by using other inert gases, such as nitrogen and the like.

Generally the time required to complete the reaction may be varied over a wide range. Reaction times from about 5 minutes to about 12 hours can be used. The time of reaction is, however, to a certain extent, a dependent variable. For example, as the temperature of the reaction is increased, the reaction time may be decreased. Furthermore, batch processes would normally allow for longer reaction times, whereas a continuous process would utilize a shorter time.

A molar ratio of $CO:H_2$ which should be maintained during the reaction is from about 1.5:1 to about 1:5. It is preferred that the $CO:H_2$ ratio be in the range of from about 1:1 to about 1:3. Reaction ratios of the CO and $H_2$ outside the ranges given can also be used.

The amount of catalyst which is used in the present hydroformylation process may be varied. Sufficient rhodium complex catalyst is used in order that the reaction mixture is 0.005 to 0.1 molar with respect to rhodium. A preferred molar concentration range for rhodium is 0.005 to 0.02.

The present process can also be carried out in the presence of an added excess amount of $L(OR)_3$ ligand. The amount of $L(OR)_3$ used may vary from 0.5 to 100 moles of $L(OR)_3$ per mole of $HRhCO[L(OR)_3]_3$ catalyst; the preferred $L(OR)_3:HRhCO[L(OR)_3]_3$ molar ratio is 20:1 to 1:2; while 5:1 to 1:2 is a more preferred molar ratio, and 3:1 is a most preferred molar ratio.

The rhodium complex used as a catalyst in the present hydroformylation process effects (1) low temperature and low pressure reaction and (2) greater selectivity with regard to increasing the amount of linear aldehyde in the product. Ordinarily, hydroformylation of an $C_3$ or higher alpha olefin produces a mixture of aldehydes (having one carbon atom more than said olefin) which is about 60% linear and about 40% branched. For example, ordinary hydroformylation of butene-1 using $Co_2(CO)_8$ catalyst will yield a mixture of pentanals about 60% of which are n-pentanal. In the present process the linear aldehyde content of the total aldehyde product is over 85%.

Another outstanding feature of the present catalyst system is that it effects a hydroformylation rate substantially greater than the two component rhodium on carbon black/excess trihydridocarbylphosphite catalyst system disclosed in the aforesaid article by Pruett and Smith.

The following examples will illustrate the prsent hydroformylation process and the improvement in reaction rate over the Pruett and Smith catalyst system. As used herein the term conversion refers to the amount of starting olefin which has reacted to produce aldehyde product; and it is expressed as per cent conversion (by weight). Per cent linearity indicates the proportion of linear aldehyde in the total aldehyde product.

EXAMPLE 21

Hydroformylation Using

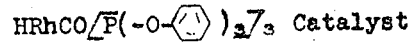 Catalyst

A suitable reaction vessel was charged with 0.3187 grams (0.300 mmoles) of

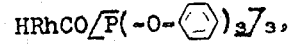

1.517 grams of pentadecane (an internal standard), 0.139 grams of nonane (another internal standard), and 23.0 milliliters of benzene. Carbon monoxide was bubbled through the stirred mixture for 5 – 15 minutes. Then, the vessel was charged with 3.57 grams (31.8 mmoles) of octene-1. Hydrogen and CO were each bubbled simultaneously through the mixture at a rate of 30 milliliters per minute for 2½ hours at 25°C.; the $H_2:CO$ ratio for this period was 1:1. Then the flow of hydrogen was increased to 90 milliliters/minute for the next 1½ hours at 25°C.; the $H_2:CO$ ratio during this period was 3:1.

Samples were withdrawn from the reaction mixture during the course of the reaction and analyzed by vpc (vapor phase chromatography) for olefin and aldehyde. The product obtained contained n-nonanal and 2-methyloctanal-1. The results of the analysis of the samples which were withdrawn are presented below:

| Sample | Reaction Time (hrs.) | Conversion, to $C_9$ Aldehydes | Linearity, % |
|---|---|---|---|
| 1 | ½ | 12.4 % | 88.1 |
| 2 | 1 | 25.6 % | 87.7 |
| 3 | 1½ | 33.6 % | 88.3 |
| 4 | 2 | 47.9 % | 88.6 |
| 5 | 2½ | 57.5 % | 88.3 |
| 6 | 2¾ | 64.2 % | 88.4 |
| 7 | 3 | 77.4 % | 89.5 |
| 8 | 3¼ | 85.6 % | 89.8 |
| 9 | 3¾ | 86.5 % | 90.0 |
| 10 | 4 | 86.5 % | 89.5 |

EXAMPLE 22

Hydroformylation Using 5% Rh on Carbon/Excess Triphenylphosphite Catalyst

A suitable flask was first flushed with nitrogen and then it was charged with 3.0 grams of 5% rhodium on carbon black (1.45 mmoles of rhodium), 3.0 grams (9.68 mmoles) of triphenylphosphite, 22.4 grams (200 mmoles) of octene, 1.52 grams (7.16 mmoles) of n-pentadecane (internal standard), and 40 milliliters of toluene. Then $H_2:CO$ was bubbled into the stirred mixture in a 1:1 ratio for 12 hours at room temperature (about 25°C.); and the linearity was 90%. The reaction was discontinued at the end of this time. Analysis of the reaction mixture by vpc showed that 13.1 mmoles of n-nonanal and 1.42 mmoles of 2-methyloctanal were present; which calculated to be 7.3% conversion.

Similar results are obtained when HRh(CO)—[As(OC₆H₅)₃]₃ and AS(O-C₆H₅)₃; HRhCO [As(—O—⟨⟩—Br)₃]₃ and As(-O-⟨⟩-Br)₃; or HRh(CO)[Sb(—O—C₆H₅)₃] and Sb(O—C₆H₅)₃ are used as the catalyst system in Example 23.

EXAMPLE 23

Hydroformylation Using HRhCO[P(-O-⟨⟩)₃]₃ and Slight Excess of Triphenylphosphite

A suitable reaction vessel was charged with 0.3187 grams (0.300 mmoles) of

HRhCO[P(-O-⟨⟩)₃]₃, 0.0996 grams (0.322 mmoles) of triphenylphosphite, 0.364 grams of nonane (an internal standard), 1.533 grams of pentadecane (another internal standard) and 25 milliliters of benzene. Carbon monoxide was passed through the stirred mixture for 5 - 15 minutes. Then the vessel was charged with 3.54 grams (31.5 mmoles) of octene-1. The solution was stirred at 25° ± 0.5°C. and 20 milliliters/minute each of hydrogen and CO was passed into the mixture for 6.75 hours. Samples were withdrawn during the course of the reaction and analyzed by vpc. The results of the analysis are given below. The aldehyde product was a mixture of C₉ aldehydes containing n-nonanal and 2-methyloctanal-1.

| Sample | Reaction Time, (hrs.) | Conversion, to C₉ Aldehyde | Linearity, % |
|---|---|---|---|
| 1 | ¼ | 3.1 % | 86.5 |
| 2 | 1 | 11.5 % | 87.0 |
| 3 | 2 | 22.0 % | 87.9 |
| 4 | 3 | 31.6 % | 88.0 |
| 5 | 4 | 40.7 % | 88.2 |
| 6 | 5 | 48.5 % | 88.2 |
| 7 | 6 | 53.1 % | 87.5 |
| 8 | 6¾ | 58.5 % | 88.3 |

EXAMPLE 24

Hydroformylation Using HRhCO[P(-O-⟨⟩)₃]₃ and Larger Excess of Triphenylphosphite

The Example 23 experiment was substantially repeated except that the amount of triphenylphosphite was increased to 0.2637 grams (0.850 mmoles); and the reaction was continued for 7 hours. The result of the vpc analysis of the samples withdrawn during the course of this reaction are given below. The product was a mixture of C₉ aldehydes containing n-nonanal and 2-methyloctanal-1.

| Sample | Reaction Time, (hrs.) | Conversion, to C₉ Aldehyde | Linearity, % |
|---|---|---|---|
| 1 | ¼ | 1.4 % | 87.4 |
| 2 | 1 | 5.4 % | 86.9 |
| 3 | 2 | 11.3 % | 89.0 |
| 4 | 3 | 16.0 % | 87.9 |
| 5 | 4 | 20.0 % | 87.9 |
| 6 | 5 | 24.4 % | 88.3 |
| 7 | 6 | 28.7 % | 88.3 |
| 8 | 7 | 32.4 % | 88.3 |

Analogous results are obtained in Example 24 when the reaction temperature is 0°C., 10°C., 16°C., or 50°C.

The results obtained in Examples 21, 23–24 show the effectiveness of the present rhodium complexes as hydroformylation catalysts. A comparison of these results with the results obtained in Example 22 illustrates how much more effective the hydroformylation catalyst of the present complex is as compared with rhodium on carbon/excess hydrocarbyl phosphite. For ease of comparison, the results from Examples 21-24 are presented in the following table:

Table A

| Ex. | Catalyst | Molar Ratio Rh:P(O-⟨⟩)₃ | Reaction Time | Conversion |
|---|---|---|---|---|
| 22 | Rh/C + P(O-⟨⟩)₃ | 1:6 | 12 hrs. | 7.6 % |
| 21 | HRhCO[P(O-⟨⟩)₃]₃ | 1:3 (¹) | 3-2/3 hrs. | 86.5 % |
| 24 | HRhCO[P(O-⟨⟩)₃]₃ + P(O-⟨⟩)₃ | 1:6 (¹) | 7 hrs. | 32.4 % |
| 23 | HRhCO[P(O-⟨⟩)₃]₃ + P(O-⟨⟩)₃ | 1:4 (¹) | 6-3/4 hrs. | 58.5 % |

(¹) included P(O-⟨⟩)₃ contained in complex.

It is clear from the data in Table A that the rhodium complex catalyst effects an unexpectedly greater rate of reaction than the rhodium on carbon black system. The olefin conversion using the present complex (Example 21) is 86.5%/o after only 2⅔ hours; olefin conversion using the rhodium on carbon/triphenylphosphite catalyst (Example 22) is only 7.6%/o, after 12 hours. Furthermore, even when the rhodium:phosphite molar ratio, using the present complex, is raised (by the addition of phosphite to the reaction mixture) to the 1:6 molar ratio level of Example 22, olefin conversion is still significantly higher viz. 32.4%/o — Example 24 vs. 7.6%/o — Example 22.

EXAMPLE 25

Using the same reactants and substantially the same amounts and following substantially the same procedure as in Example 21, a hydroformylation reaction was carried out at 50°± 1°C. utilizing a 30 milliliter/minute flow rate for each of hydrogen and CO. Samples were withdrawn from the mixture during the reaction and analyzed by vpc. The product was a mixture of $C_9$ aldehydes containing n-nonanal and 2-methyloctanal. The results of the analysis are presented in the table which follows:

| Sample | Reaction Time (hrs.) | Conversion, to $C_9$ Aldehyde | Linearity, %/o |
|---|---|---|---|
| 1 | ¼ | 15.1 %/o | 83.0 |
| 2 | ½ | 30.2 %/o | 83.8 |
| 3 | ¾ | 45.0 %/o | 83.8 |
| 4 | 1 | 48.5 %/o | 83.4 |
| 5 | 1¼ | 49.7 %/o | 81.5 |
| 6 | 1½ | 50.6 %/o | 80.9 |

Besides conversion of olefin reactant to aldehydes, the catalyst system of the present invention also isomerizes the olefin, to a certain extent. The isomerization involves shifting of the double bond within the olefin molecule. Thus, e.g. besides $C_9$ aldehydes, octene isomers such as octene-2, octene-3 and the like are also found in the products in Examples 21, 23–25. This isomerization generally increases with increasing temperature.

Similar results are obtained when equivalent amounts of other rhodium complex compounds (as described and extensively exemplified hereinabove) are used as catalysts in the hydroformylation processes illustrated by Examples 21, 22–25. This includes the As and Sb analogs of the P containing complexes. As pointed out above, the complexes containing phosphite ligand (as described and exemplified above) are more preferred as catalysts in the present process.

The molar concentration of rhodium in Examples 21, 23–25 is 0.01 or 0.03. Analogous results are obtained when the amount of rhodium complex used in these Examples provides a rhodium molar concentration of 0.1, 0.008, 0.05, 0.09, or 0.025.

The reactions in these Examples may also be carried out at pressures above atmospheric, for example, 10 atmospheres, 100 atmospheres, or 50 atmospheres; but the reaction rate, as compared to the rate at atmospheric pressure, is somewhat reduced.

The reactions of Examples 21, 23–25 proceed in an analogous manner when the reaction temperature is 1°C., 18°C., 100°C., 80°C., or 60°C.

Substituting the following olefin reactants in the processes exemplified above gives aldehyde products, as indicated. The linear aldehyde content of the aldehyde products is over about 85%/o, in each case.

| Olefin Reactant | Aldehyde Products |
|---|---|
| Ethylene | → Propanal |
| Tetracosene-1 | → Pentacosanal |
| | 2-Methyltetracosanal |
| Dotriacontene-1 | → Tritriacontanal-1 |
| | 2-Methyldotriacontanal |
| Cyclohexene | → Cyclohexanal |
| Styrene | → 3-Phenylpropanal |
| | 2-Phenylpropanal |
| 2-Ethylhexene-1 | → 3-Ethylheptanal |
| Dodecene-1 | → Tridecanal-1 |
| | 2-Methyldodecanal |

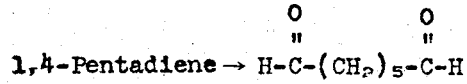

1,3-Dimethylpentanedial

2-Methylhexanedial

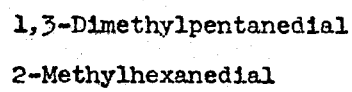

2-Methyl-8-decenal

The following two examples further illustrate the hydroformylation of the present invention carried out under pressure.

EXAMPLE 26

Hydroformylation Under Pressure Using $HRhCO[P(-O-C_6H_5)_3]_3$ Catalyst

The catalyst (0.319 grams of

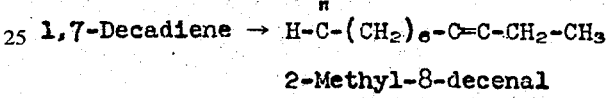

was placed in a small test tube which was positioned on a copper wire stand inside a glass, autoclave liner. The liner was evacuated and filled with nitrogen. The following reagents were then charged into the liner: 3.56 grams (31.7 mmoles) of 1-octene, 0.407 grams of nonane, 1.553 grams of pentadecane, and 22.5 milliliters of benzene. The charged liner was placed into a rocking autoclave which was sealed and flushed well with carbon monoxide. The autoclave was then pressured to 10 p.s.i. with carbon monoxide and up to 85 p.s.i. with hydrogen (about 3:1 $H_2$:CO ratio). Then the autoclave rocking was begun and the reaction was allowed to proceed in this way for two hours at 25°C. (periodically during this period the autoclave was repressured from 83 to 85 p.s.i. with either carbon monoxide or hydrogen as required to maintain 3:1 $H_2$:CO ratio). At the end of this time, the autoclave was vented and flushed with carbon monoxide.

The product obtained was analyzed by vpc. Conversion to $C_9$ aldehydes was 45.5%/o; and the linear $C_9$ aldehyde content was 80%/o.

EXAMPLE 27

Hydroformylation Under Pressure Using 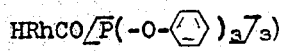 Catalyst

Using substantially the same equipment and charging procedure as in Example 26, the following reagents were charged to a glass rocking autoclave liner: 0.2081 grams (0.151 mmoles) of $HRhCO[(p-ClC_6H_4)_3P]_3$, 3.55 grams (3.16 mmoles) of 1-octene, 0.374 grams of nonane, 1.518 grams of pentadecane, and 22.5 milliliters of benzene. The liner was then placed in an autoclave and it was flushed with carbon monoxide, sealed and then pressured to 85 p.s.i. with hydrogen. (The $H_2$:CO ratio was about 3:1). The autoclave was then rocked and the reaction was continued under these conditions for three hours at 20°–23°C. During this reaction period the autoclave was repressured twice with carbon monoxide from 83 to 85 p.s.i. At the end of this time, the autoclave was vented and flushed with carbon monoxide.

The product obtained was analyzed by vpc. Conversion to $C_9$ aldehyde was 25%; and linear aldehyde content was 92.3%.

The aldehyde products from the hydroformylation are useful as chemical intermediates. For example, the aldehydes can be oxidized to produce the corresponding carboxylic acids; and these acids can be used to prepare esters which are useful as lubricants, plasticizers, and the like. The aldehyde products are ordinarily mixtures of aldehyde isomers as pointed out above. These mixtures can be conveniently used as such; or if desired, they may be separated by any suitable means.

The present invention comprises three embodiments, namely, novel rhodium complexes, a method for preparing such complexes, and a hydroformylation process utilizing said novel complexes as catalysts. These embodiments have been fully described above. Claims to the invention follow.

I claim:

1. A method for preparing compounds having the formula $HRh(CO)[L(OR_1)(OR_2)(OR_3)]_3$ wherein L is selected from P, As, and Sb, and $R_1$, $R_2$, and $R_3$ are independently selected from the groups consisting of alkyl and aryl, said groups having from one to about 20 carbon atoms, which comprises reacting
   a. a compound having the formula $XRhCO[L(OR_1)(OR_2)(OR_3)]_2$ wherein X is a halogen and L, $R_1$, $R_2$, and $R_3$ are as defined above,
   b. a substantially stoichiometric amount based on compound (a) of a compound having the formula $L(OR_1)(OR_2)(OR_3)$ wherein L, $R_1$, $R_2$, and $R_3$ are as defined above, and
   c. a metal borohydride in a $C_1$—$C_6$ alkanol reaction medium at temperatures ranging from about −20°C. to above 30°C.

2. The method of claim 1 wherein L is phosphorous.
3. The method of claim 1 wherein $R_1$, $R_2$, and $R_3$ are the same.
4. The method of claim 3 wherein L is phosphorous.
5. The method of claim 4 wherein $R_1$, $R_2$, and $R_3$ are selected from hydrocarbon alkyl groups and substituted alkyl groups wherein said substituents are selected from phenyl,, halogen, $C_1$—$C_4$ alkoxy, cyano and nitro groups.
6. The method of claim 4 wherein $R_1$, $R_2$, and $R_3$ are selected from phenyl and substituted phenyl groups wherein said substituents are selected from halogen, $C_1$—$C_4$ alkoxy, cyano, nitro, phenyl and $C_1$—$C_6$ alkyl groups.
7. The method of claim 4 wherein $R_1$, $R_2$, and $R_3$ are phenyl.
8. The method of claim 4 wherein $R_1$, $R_2$, and $R_3$ are p-chlorophenyl.
9. The method of claim 2 wherein the molar ratio of $XRhCO[(L(OR_1)(OR_2)(OR_3)]_3$:metal borohydride is between 1:1.1 and about 1:2.
10. The method of claim 9 wherein said metal borohydride is selected from alkali metal borohydrides and aluminum borohydrides.
11. The method of claim 10 wherein said metal borohydride is an alkali metal borohydride.
12. The method of claim 10 wherein said alkali metal borohydride is sodium borohydride.
13. The method of claim 2 wherein said alkanol is ethanol.
14. The method of claim 2 wherein said reaction temperature is between about 0°C. and 15°C.
15. The method of claim 14 wherein said alkanol is ethanol and said methal borohydride is sodium borohydride.
16. The method of claim 15 wherein $R_1$, $R_2$, and $R_3$ are phenyl.
17. The method of claim 15 wherein $R_1$, $R_2$, and $R_3$ are p-chlorophenyl.

* * * * *

UNITED STATES PATENT AND TRADEMARK OFFICE
CERTIFICATE OF CORRECTION

PATENT NO. : 3,907,847
DATED : September 23, 1975
INVENTOR(S) : Kestutis A. Keblys It is certified that error appears in the above-identified patent and that said Letters Patent are hereby corrected as shown below:

Column 1, line 12 - that part of the formula reading: "$[P(OO)_3]_3$" should be -- $[P(O\emptyset)_3]_3$ --

Column 2, line 23 - "asa" should be -- as --

Signed and Sealed this sixteenth Day of December 1975

[SEAL]

Attest:

RUTH C. MASON
*Attesting Officer*

C. MARSHALL DANN
*Commissioner of Patents and Trademarks*